(12) United States Patent
Auweter et al.

(10) Patent No.: US 6,494,924 B1
(45) Date of Patent: Dec. 17, 2002

(54) PRECIPITATED WATER-INSOLUBLE COLORANTS IN COLLOID DISPERSE FORM

(75) Inventors: Helmut Auweter, Limburgerhof (DE); Heribert Bohn, Wattenheim (DE); Robert Heger, Heidelberg (DE); Dieter Horn, Heidelberg (DE); Bernd Siegel, Otterstadt (DE); Karl Siemensmeyer, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/623,520

(22) PCT Filed: Mar. 31, 1999

(86) PCT No.: PCT/EP99/02217

§ 371 (c)(1),
(2), (4) Date: Oct. 3, 2000

(87) PCT Pub. No.: WO99/51695

PCT Pub. Date: Oct. 14, 1999

(30) Foreign Application Priority Data

Apr. 3, 1998 (DE) .......................................... 198 15 129

(51) Int. Cl.⁷ .................................................. D06P 5/12
(52) U.S. Cl. ...................... 8/456; 8/445; 8/478; 8/495; 8/532; 8/554; 8/552
(58) Field of Search ............................ 8/552, 554, 445, 8/495, 532, 478, 456

(56) References Cited

U.S. PATENT DOCUMENTS

| 3,947,246 | A | * | 3/1976 | Eibl et al. ......................... 8/62 |
| 4,213,900 | A |   | 7/1980 | Daubach et al. ............ 260/208 |
| 4,239,491 | A | * | 12/1980 | Baumgarte et al. ............. 8/532 |
| 4,265,631 | A | * | 5/1981 | Becker ........................... 8/471 |
| 4,319,881 | A | * | 3/1982 | Koci et al. ...................... 8/532 |
| 4,356,109 | A | * | 10/1982 | Saeki et al. .................. 252/316 |
| 4,702,742 | A | * | 10/1987 | Iwata et al. ..................... 8/495 |
| 5,531,816 | A |   | 7/1996 | Wickramanayake .... 106/208 R |
| 6,123,740 | A | * | 9/2000 | Sens et al. ...................... 8/445 |
| 6,136,046 | A | * | 10/2000 | Fukunishi et al. .............. 8/552 |
| 6,241,787 | B1 | * | 6/2001 | Nigam ........................... 8/543 |

FOREIGN PATENT DOCUMENTS

| DE | 27 32 500 |   | 1/1979 |
| GB | 2018835 | * | 10/1979 |

OTHER PUBLICATIONS

B.J. Berne, et al., Dynamic Light Scattering, pps. 193–197, "Effects of Polydispersity on Time–Correlation Functions and Spectra," 1976.

* cited by examiner

*Primary Examiner*—Gregory Delcotto
*Assistant Examiner*—Eisa Elhilo
(74) *Attorney, Agent, or Firm*—Oblon, Spivak, McClelland, Maier & Neustadt, P.C.

(57) ABSTRACT

The dyes have an average particle size within the range from 5 nm to 1 $\mu$m and a variance of less than 50%. They are especially useful for ink-jet ink preparations.

12 Claims, No Drawings

PRECIPITATED WATER-INSOLUBLE COLORANTS IN COLLOID DISPERSE FORM

The present invention relates to precipitated, water-insoluble dyes in colloidally disperse form, to a process for preparing them and to their use.

Pigments and disperse dyes are the most important representatives of the group of water-insoluble dyes. It is frequently necessary, in the case of disperse dyes even essential, to use them in colloidally disperse form. The colloidally disperse form is particularly important when the dyes are used in ink-jet printing, a widely used process, for the contactless printing of various print media, for example paper, film, photopaper and textiles. To obtain a colloidally disperse form, the dye crystals are generally mechanically comminuted, for example by grinding. A decisive disadvantage of grinding is that metallic attritus or attritus from the grinding media ends up in the dye powder and can lead to major problems in the use of the dye powder. For example, ink-jet printing nozzles may be damaged or blocked.

Pigments and disperse dyes in colloidally disperse form have to be stabilized against recrystallization, agglomeration and flocculation. U.S. Pat. No. 5,531,816 proposes a waterborne ink-jet ink composition comprising at least one deagglomerated pigment having a particle size within the range from 5 nm to 1 µm, at least one water-insoluble organic compound and at least one amphiphilic compound. The amphiphile solubilizes the water-insoluble organic compound in the aqueous phase in the form of small droplets. The pigment is dispersed in the droplets of the water-insoluble organic compound and so maintained in the deagglomerated state.

DE 27 32 500 A describes a process for preparing water-dispersible, pulverulent disperse dyes by spray drying a solution of the dyes in formic acid, formamide, N-methylformamide, butyrolactone or ethylene glycol. The solution may further comprise dispersants, surfactants and protective colloids. The dye powder obtained consists of particles in the nanoparticle range.

Prior art dye particles all have a relatively broad particle size distribution, which is why the brilliance of the color leaves something to be desired. In addition, prior art dye particles are highly crystalline and have a nonuniform particle shape.

It is an object of the present invention to provide water-insoluble dyes in colloidally disperse form which have a narrow particle size distribution. In addition, the dye particles shall be substantially spherical and amorphous.

It has now been found that this object is achieved, surprisingly, by dye particles obtained by precipitation from a solution of the dye in a water-miscible organic solvent.

The present invention accordingly provides precipitated, water-insoluble or sparingly water-soluble dyes in colloidally disperse form having an average particle size within the range from 5 nm to 5 µm and having a particle size distribution width (variance) of less than 50% (both measured by quasi-elastic light scattering and evaluation by the cumulant method; cf. Bruce J. Berne and Robert Pecora, "Dynamic Light Scattering", John Wiley & Sons, Inc. 1976, p. 196f.).

The average particle size is preferably within the range from 5 nm to 1 µm, especially within the range from 5 nm to 500 nm. The width of the particle size distribution is preferably less than 40%.

The dye particles of the invention possess only a small crystalline content by virtue of the process used for preparing them. The crystallinity is preferably not more than 30%, especially not more than 10%. Particularly preferably, the particles are present in completely amorphous form.

In addition, preferably not less than 80%, especially not less than 90%, of the dye is present in the form of spherical particles.

Because of their narrow particle size distribution, the dyes of the invention provide a cleaner color, and hence greater brilliance, in paper and photo printing in particular. In addition, they also provide higher color strength.

The dyes of the invention further exhibit advantageous viscosity characteristics and are simple to apply to fibers because of their high amorphous content.

Preference according to the invention is given to water-insoluble or sparingly water-soluble azo, anthraquinone, quinophthalone, methine and azamethine dyes.

The dye particles of the invention can be prepared by two different methods, by

A) precipitating it from a solution in a water-miscible organic solvent, or

B) preparing an oil-in-water emulsion from a solution of the dye in a water-immiscible organic solvent and precipitating the dye particles by stripping off the solvent.

Method A) (Water-miscible Solvent)

To produce the dye particles of the invention, the coarsely crystalline dye particles are initially dissolved in a suitable water-miscible organic solvent. Which solvent is used depends on the solubility properties of the dye. In principle, all water-miscible (which also includes those solvents which are miscible with water only to a proportion of not less than about 10% by weight) organic solvents are usable. In general, thermally stable solvents of this type are used. Suitable solvents are:

1. mono- and polyalcohols such as methanol, ethanol, n-propanol, isopropanol, glycol, glycerol, propylene glycol, polyethylene glycols, etc.;
2. ethers, such as tetrahydrofuran, dioxane, 1,2-propanediol 1-n-propyl ether, 1,2-butanediol 1-methyl ether, ethylene glycol monomethyl ether, diethylene glycol monomethyl ether, etc.;
3. esters, such as methyl acetate, monoesters of ethylene glycol or propylene glycols with acetic acid, butyrolactone, etc.;
4. ketones, such as acetone or methyl ethyl ketone;
5. amides, such as formamide, dimethylformamide, dimethylacetamide, N-methylpyrrolidone and hexamethylphosphoramide;
6. sulfoxides and sulfones, such as dimethyl sulfoxide and sulfolane;
7. alkanecarboxylic acids, such as formic acid or acetic acid.

Preference is given to the solvents recited above under 1 to 5, especially methanol, ethanol, n-propanol, isopropanol, 1,2-butanediol 1-methyl ether, 1,2-propanediol 1-n-propyl ether, dimethylacetamide, N-methylpyrrolidone or acetone.

The amount of solvent depends on the dye to be dissolved. In general, it is desirable to keep the amount of solvent used to a minimum.

The coarsely crystalline dyes are generally dissolved at elevated temperature, since the solubility is too low at room temperature or below. The dissolving is preferably effected at from 50 to 300° C., especially at from 100 to 300° C. If the boiling point of the solvent is too low, the dissolving may also be effected under superatmospheric pressure, for example at a pressure of up to 50 bar.

The precipitating of the dye particles in colloidally disperse form is then effected by adding water to the solution of the dye in the water-miscible organic solvent. The temperature at which the precipitating step takes place is not critical. Advantageously, water of from 0 to 50° C. is added to the hot solution of the dye.

The water preferably comprises at least one protective colloid in order that the reagglomeration of the colloidally disperse particles may be prevented. Protective colloids used include the natural or synthetic polymers customarily used for this purpose. Useful natural or semisynthetic protective colloids include for example gelatin, including fish gelatin, starch or starch derivatives, such as dextrins, pectin, gum arabic, casein, caseinate, alginates, cellulose and cellulose derivatives, such as methylcellulose, carboxymethylcellulose, hydroxypropylcellulose or hydroxypropylmethylcellulose.

Useful synthetic protective colloids are water-soluble homo- or copolymers, which can be neutral polymers, cationic polymers or anionic polymers. Similarly, complexes of polycationic and polyanionic polymers and also coacervates are contemplated.

The polymers are polymerized from monomers having hydrophilic groups and optionally comonomers having hydrophobic groups, the ratio between hydrophilic and hydrophobic groups being chosen in such a way that the copolymer is water-soluble.

Suitable hydrophilic monomers include for example N-vinyllactams, such as N-vinylpyrrolidone; acrylamide or methacrylamide and their N-$C_1$–$C_4$-mono- or N,N-di-$C_1$–$C_4$-alkyl derivatives; acrylic acid or methacrylic acid; monomers having a primary, secondary or tertiary basic nitrogen atom, such as amino-$C_2$–$C_4$-alkyl acrylates and methacrylates, e.g., dimethylaminoethyl (meth)acrylate, and the $C_1$–$C_4$-alkyl-quaternized derivatives thereof; ethylenically unsaturated sulfonic acids, such as vinylsulfonic acid; acrylamido-N-propanesulfonic acid and styrenesulfonic acid; hydroxy-$C_2$–$C_4$-alkyl acrylates and methacrylates; allyl alcohol and methallyl alcohol; olefinically unsaturated compounds having epoxy groups, such as glycidyl acrylate and glycidyl methacrylate; monoesters and diesters of ethylenically unsaturated $C_4$–$C_8$-dicarboxylic acids, such as maleic acid and itaconic acid, with amino alcohols, such as dimethylaminoethanol; and amides or imides of these carboxylic acids with diamines, such as dimethylaminopropylamine.

Suitable comonomers having hydrophobic groups include for example $C_2$–$C_4$-alkyl vinyl ethers, such as ethyl vinyl ether; vinyl esters of $C_2$–$C_8$-carboxylic acids, such as vinyl acetate and vinyl propionate; $C_1$–$C_8$-alkyl acrylates and methacrylates, such as methyl, ethyl, n-butyl and 2-ethylhexyl acrylates and methacrylates; aromatic vinyl compounds such as styrene; and 1-olefins having up to 20 carbon atoms, such as ethylene, propylene or isobutylene.

Polymers useful as protective colloid are thus in particular polyvinylpyrrolidone, polyacrylic acid or polymethacrylic acid and copolymers thereof with a dicarboxylic anhydride of an ethylenically unsaturated $C_4$–$C_8$-carboxylic acid, such as maleic anhydride or itaconic anhydride; polyvinyl alcohol and partially hydrolyzed polyvinyl acetate; polyacrylamide and polymethacrylamide and their partially hydrolyzed derivatives; polymers of monomers having a primary, secondary or tertiary amino group and the N-$C_1$–$C_4$-mono- and N,N-$C_1$–$C_4$-dialkyl derivatives and also the $C_1$–$C_4$-alkyl-quaternized derivatives thereof; polyethylene oxides and polypropylene oxides and also block copolymers thereof; polyamino acids such as polyaspartic acid and polylysine, and also condensates of phenylsulfonic acid with urea and formaldehyde and condensates of naphthalenesulfonic acid with formaldehyde.

The amount of protective colloid in the aqueous phase is generally within the range from 1 to 50% by weight, preferably within the range from 5 to 30% by weight, based on the total weight of the aqueous phase. The weight ratio of dye to protective colloid is generally within the range from 2:1 to 1:20. The amount of aqueous phase added depends on the dye, the concentration of the dye solution and the concentration of protective colloid in the aqueous phase. In general, the dye solution and the aqueous phase are used in a weight ratio within the range from 1:2 to 1:20.

The dye particles may be precipitated in the presence of additives customary in such cases, for example in the presence of one of the below-mentioned surfactants.

The mixing of dye solution and aqueous phase advantageously takes place as rapidly as possible. Suitable equipment for this purpose is known to the person skilled in the art. It is possible to use, for example, Y- or T-mixers or static mixers.

The novel process for producing the dye particles can be operated continuously or batchwise.

Method B) (Water-immiscible Solvent)

To prepare the dye particles of the invention by method B, the coarsely crystalline dye particles are initially dissolved in a suitable water-immiscible organic solvent. Which solvent is used depends on the solubility properties of the dye. In principle, all water-immiscible organic solvents are usable. In general, thermally stable solvents of this type are used.

Preferred solvents are chlorinated hydrocarbons, such as chloroform, dichloroethane or methylene chloride.

The dissolving of the dye is effected as described under A).

The solvent phase is vigorously stirred into the aqueous phase with the aid of a suitable apparatus, for example an Ultra-Turrax, to prepare an oil-in-water emulsion.

The water comprises at least one emulsifier to stabilize the emulsion droplets and prevent coalescence.

The emulsifiers used include the abovementioned natural, semisynthetic or synthetic protective colloids.

The amount of emulsifier in the aqueous phase is generally within the range from 1 to 50% by weight, preferably within the range from 5 to 30% by weight, based on the total weight of the aqueous phase. The weight ratio of dye to emulsifier is generally within the range from 2:1 to 1:20. The amount of aqueous phase added depends in particular on the emulsifying power of the emulsifier and on the desired emulsion droplet size. In general, the dye solution and the aqueous phase are used in a weight ratio within the range from 1:2 to 1:20.

The emulsifying may be carried out in the presence of additives customary in such cases, for example in the presence of one of the below-described surfactants.

As the next step of method B), the solvent is stripped out of the emulsion by reduced pressure and/or by heating the emulsion to convert the emulsion into a purely aqueous dispersion. In the process, the dye particles of the invention are formed by precipitation.

The novel process for producing the O/W emulsion and the removal of the solvent by stripping can be carried out continuously or batchwise.

The colloidal dye solution obtained using the process of the invention can be processed directly into the desired colorants. Alternatively, the dye solution can be concentrated by removing some of the volatiles in a conventional manner. The volatiles can also be removed completely, for example by spray drying. This provides the dyes of the invention in the form of a dry powder which can be reconverted into a colloidal solution in water.

The amount of dye in the colorant is generally within the range from 0.1 to 10% by weight, preferably within the range from 1 to 8% by weight.

The as-precipitated colloidal solution of the dye can be used directly as colorant. In general, however, additive and auxiliary substances customary for the formulating of a colorant will be added. Particular preference is given to processing the dyes, or colloidal dye solutions, into ink-jet ink preparations comprising at least one of the dyes of the invention in colloidally disperse form in an aqueous medium.

For most applications, it is necessary to add surfactants, which are selected according to the desired field of application. The customary anionic, cationic or nonionic surfactants may be used.

Suitable surfactants, especially for use in ink-jet preparations, are anionic, cationic and nonionic surfactants. Anionic surfactants include for example soaps, alkanesulfonates, olefinsulfonates, alkylarylsulfonates, alkylnaphthalenesulfonates, alkyl sulfates and alkyl ether sulfates, alkyl methyl ester sulfonates, acylglutamates, sarcosinates and taurates. Examples are sodium lauryl sulfate, sodium lauryl ether sulfate, oleylsulfonate, nonylbenzenesulfonate, sodium dodecylbenzensulfonate and butylnaphthalenesulfonate.

Catonic surfactants include for example alkyltrimethylammonium halides/alkyl sulfates, alkylpyridinium halides and dialkyldimethylammonium halides/alkyl sulfates.

Suitable nonionic surfactants include for example alkoxylated animal/vegetable fats and oils, e.g., maize oil ethoxylates, castor oil ethoxylates, tallow fat ethoxylates; glyceryl esters, for example glyceryl monostearate; fatty alcohol alkoxylates and oxo-alcohol alkoxylates; alkylphenol alkoxylates, for example isononylphenol ethoxylates; and sugar surfactants, for example sorbitan fatty acid esters (sorbitan monooleate, sorbitan tristearate), polyoxyethylene sorbitan fatty acid esters.

It is also possible to use zwitterionic surfactants, such as sulfobetaines, carboxybetaines, alkyldimethylamine oxides, for example tetradecyldimethylamine oxide, and polymeric surfactants, such as di-, tri- and multi-block polymers of the type (AB)x-, ABA and BAB, for example polyethylene oxide-block-polypropylene oxide, polystyrene-block-polyethylene oxide, and AB comb polymers, for example polymethacrylate-comb-polyethylene oxide.

The amount of surfactant, if present, is generally within the range from 0.5 to 25% by weight, especially within the range from 1 to 15% by weight, based on the total weight of the preparation.

The preparation may comprise further additives, such as viscosity control additives, for example water-soluble starch and cellulose derivatives as thickeners, additives for improving the drying characteristics, for example isopropanol, acetone, diethylene glycol, butyltriglycol; biocides and fungicides; sequestrants, such as ethylenediaminetetraacetic acid; and buffer solutions for pH control.

The dyes and colorants of the invention are useful for printing print media, especially paper, foil, film, papers for the reproduction of digital photographic images and graphics, and also for printing textiles, especially those composed of synthetic fibers. The preferred process for printing textiles is transfer printing.

The Examples hereinbelow illustrate the invention without limiting it.

EXAMPLE 1

30 g of a blue quinone dye were stirred into 250 g of NMP at 25° C. to form a cloudy coarsely disperse solution.

This solution was heated in a heat exchanger to convert it into a molecularly dissolved state. The residence time of the quinone blue solution in the heat exchanger was about 80 s at 210° C.

To precipitate the dye in colloidally disperse form, the molecularly disperse solution was introduced into a mixing chamber at 210° C. In the mixing chamber, the solution was mixed with a solution of 200 g of Sokalan CP 5 (acrylic acid-maleic anhydride copolymer) in 2320 g of water. The entire process took place under a pressure limit of 30 bar to prevent solvent evaporation. After mixing, a colloidally disperse quinone blue dispersion was obtained.

Quasi-elastic light scattering showed the average particle size to be 310 nm coupled with a variance of 43%.

EXAMPLE 2

30 g of a blue quinone dye were dissolved and precipitated as described in Example 1 with Sokalan CP5 protective colloid replaced by Wettol D1 (phenolsulfonic acid urea formaldehyde condensate). A colloidally disperse quinone blue dispersion was obtained.

Quasi-elastic light scattering showed the average particle size to be 270 nm coupled with a variance of 45%.

EXAMPLE 3

2 g of a red methine dye were dissolved in 40 g of methylene chloride at 25° C. and then emulsified in an aqueous phase by means of an Ultra-Turrax. The aqueous phase was made up of 530 g of water and 20 g of 1M NaOH and contained 4 g of casein in solution.

A rotary evaporator was used at 60° C. and a pressure of 90 mbar to remove the methylene chloride and the dispersion was then concentrated to a dye content of 3% by weight.

Quasi-elastic light scattering showed the particle size to be 213 nm coupled with a variance of 38%.

EXAMPLE 4

Preparation of a 1% Strength Ink-jet Formulation

The colloidal dispersion obtained in Example 1 has the following components added to it for formulating an ink-jet ink: 240 g of polyethylene glycol as humectant, 500 g of sorbitol as thickener and 15 g of glutardialdehyde as biocide. Size, shape and morphology of the colloidal dye particles remain intact in this formulation.

EXAMPLE 5

Preparation of a 3% Ink-jet Formulation

The colloidal dispersion obtained in Example 2 is concentrated threefold by removing some of the liquid phase by stripping. This concentrated colloidal solution has the following components added to it for formulating an ink-jet ink: 80 g of polyethylene glycol as humectant, 150 g of sorbitol as thickener and 5 g of glutardialdehyde as biocide. Size, shape and morphology of the colloidal dye particles remain intact in this formulation.

We claim:

1. A process for preparing a precipitated, water-insoluble or sparingly water-soluble dye in colloidally disperse form having an average particle size within the range from 5 nm to 5 $\mu$m and having a variance of less than 50%; both measured by quasi-elastic light scattering and evaluation by the cumulant method, which comprises a) precipitating the dye from a solution in a water-miscible organic solvent by addition of an aqueous phase, or
b) precipitating the dye in an aqueous phase from an emulsion which is obtainable by emulsifying a solution of the dye in a water-immiscible organic solvent and which includes a protective colloid by stripping off the solvent.

2. The process as claimed in claim 1, wherein the precipitating is effected by adding an aqueous solution of a protective colloid.

3. The process as claimed in claim 1, wherein the protective colloid is selected from the group consisting of polyvinylpyrrolidone, polyacrylic acid, polymethacrylic acid and the copolymers thereof with an ethylenically unsaturated $C_4$–$C_8$-dicarboxylic anhydride, polyacrylamide, polymethacrylamide, polyethylene oxide, polypropylene oxide and copolymers thereof, gelatin, casein and naphthalenesulfonic acid-formaldehyde condensate.

4. A dye obtainable by the process as claimed in claim 1, wherein not less than 80% of the dye is present in the form of essentially spherical particles and having a crystallinity of not more than 30%.

5. The dye as claimed in claim 4 having a variance of less than 45%.

6. A colorant comprising the dye as claimed in claim 4, optionally together with customary auxiliary and additive substances.

7. A colorant comprising the dye as claimed in claim 4, optionally together with customary auxiliary and additive substances dispersed in an aqueous medium, wherein said colorant is in the form of an inkjet preparation.

8. A method for printing print media or textiles comprising printing said print media or textiles with a dye according to claim 4.

9. The method according to claim 8, wherein said print media comprises paper, foil, film, papers for the reproduction of digital photographic images or graphics.

10. The method according to claim 8, wherein said printing of textiles is by transfer printing.

11. The dye as claimed in claim 4, having an average, particle size within the range of 5 mm to 1 µm.

12. The dye as claimed in claim 4, having an average particle size with the range from 5 mm to 1 µm and a variance of less than 45%.

* * * * *